Figure 1:
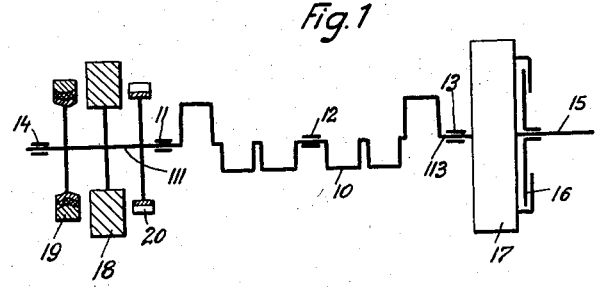

April 7, 1959  F. K. H. NALLINGER  2,880,626
CRANKSHAFT, PARTICULARLY SIX-THROW CRANKSHAFT
FOR AN INTERNAL COMBUSTION ENGINE
Filed Sept. 24, 1953

Inventor
FRIEDRICH K.H. NALLINGER.

BY Dicke and Craig.

ATTORNEYS.

2,880,626

CRANKSHAFT, PARTICULARLY SIX-THROW CRANKSHAFT FOR AN INTERNAL COMBUSTION ENGINE

Friedrich K. H. Nallinger, Stuttgart, Germany, assignor to Daimler-Benz Aktiengesellschaft, Stuttgart-Unterturkheim, Germany Application September 24, 1953, Serial No. 382,157

10 Claims. (Cl. 74—604)

My invention relates to a crankshaft, particularly six-throw crankshaft for an internal combustion engine, said crankshaft being provided with the customary flywheel ensuring constancy of the rotary speed.

Six-throw crankshafts of the type to which my invention relates are provided with an oscillation absorber serving the purpose to reduce rotary oscillations to a satisfactory degree. Experience has shown, however, that where a six-cylinder internal combustion engine equipped with a crankshaft of such kind is operated at a speed of more than 5,500 r.p.m., the oscillation absorber is unable to suppress rotary oscillations to a sufficient extent. I have found, however, that the amplitude of the objectionable rotary oscillation can be considerably reduced by the provision of both the oscillation absorber and an auxiliary flywheel mounted on or adjacent to the end of the crankshaft opposite to the end carrying the orthodox flywheel. For sake of simplicity, the end of the crankshaft provided with the orthodox flywheel will be called "rear end" hereinafter and the other end of the crankshaft will be called "front end," although it is to be clearly understood that these terms are not intended to restrict the invention to any particular mounting of the internal combustion engine within a vehicle or the like, but serves the sole purpose of easily expressing a distinction between the two ends of the crankshaft.

Preferably, the auxiliary flywheel mounted on the front end of the crankshaft is dimensioned so as to have a smaller inertia than the orthodox flywheel mounted on the rear end of the crankshaft. The oscillation absorber likewise mounted on the front end of the crankshaft and preferably coordinated with the auxiliary flywheel may be of any known type comprising, for instance, inertia members mounted for relative rotation on the crankshaft and frictionally connected thereto. Alternatively, the oscillation absorber may be of the type including spring-controlled flyweights mounted for common rotation with the crankshaft and for movement towards and away from the axis of the latter in the manner of a centrifugal governor.

By the provision on the front end of the multi-throw crankshaft of both the auxiliary flywheel and the oscillation absorber the amplitude of rotary oscillations will be effectively reduced throughout the whole range of speeds. Thus, I have found, for instance, that with a speed up to 6000 r.p.m. the oscillation will never exceed ±.1° even with extremely critical oscillations of the third degree, said amplitude being so negligible that the oscillations will not produce any noise coincidental with the engagement and disengagement of the engine clutch.

In order that the invention may be clearly understood reference will now be made to the accompanying drawing in which two embodiments of my invention are shown for the purpose of explanation or illustration of the invention rather than limitation thereof.

Figure 2:
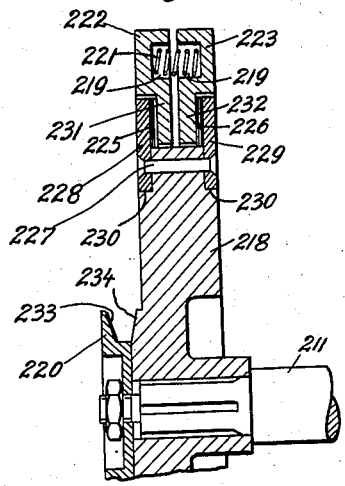
Figure 3:
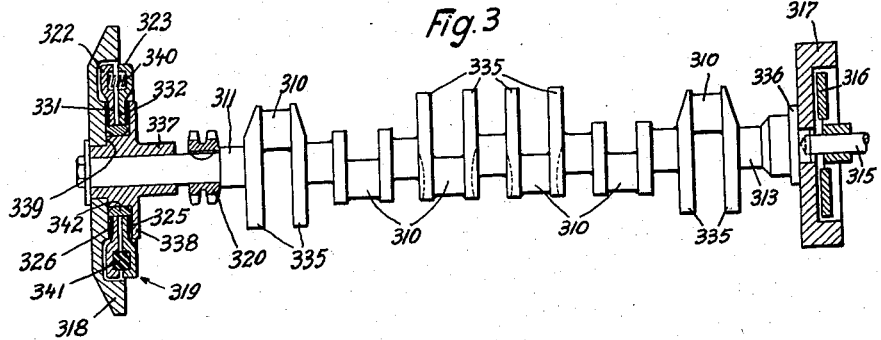

In the drawing,

Fig. 1 is a diagrammatic illustration of a six-throw crankshaft provided with a pair of flywheels and an oscillation absorber, Fig. 2 is a sectional view of the auxiliary flywheel mounted on the front end of a multi-throw crankshaft and provided with an oscillation absorber, and Fig. 3 shows partly in section a multi-throw crankshaft with a pair of flywheels and an oscillation absorber, the latter being mounted for direct cooperation with the auxiliary flywheel.

The six-throw crankshaft 10 diagrammatically shown in Fig. 1 has three co-axial pins mounted in line bearings 11, 12 and 13 including a rear end pin 113 and a front end pin 111. To the rear end pin 113 the orthodox flywheel 17 is firmly fixed, such flywheel being shaped for cooperation with a friction disk 16 of a clutch adapted to clutch the crankshaft to a driven shaft 15 for the transfer of the main driving force. For the purpose of reducing the amplitude of rotary oscillations at the critical speeds throughout the whole range of speeds of the engine, I have provided an auxiliary flywheel 18 firmly fixed to the front end 111 of the crankshaft, such auxiliary flywheel being dimensioned to have a smaller inertia than flywheel 17. Moreover, I have disposed an oscillation absorber 19 on end pin 111 in cooperative connection therewith and in proximity to the flywheel 18. In this embodiment, the oscillation absorber which is of a well known friction type is mounted between the outer bearing 14 for end pin 111 and the auxiliary flywheel 18 independently of the latter. If desired, the end pin 111 may be further provided with a driving element, such as a gear 20, for driving a cam shaft for the valve control or a shaft for any other desired purpose.

In Fig. 2 I have shown another embodiment of my invention on an enlarged scale. While in the embodiment shown in Fig. 1 the oscillation absorber 19 is mounted on end pin 111 independently of the auxiliary flywheel 18, the oscillation absorber shown in Fig. 2 is mounted on the auxiliary flywheel 218. For that purpose, the flywheel 218 which is splined on the front end pin 211 of the multi-throw crankshaft is provided near its periphery with two annular shoulders 230 for the accommodation thereon of a pair of co-axial annular plates 228 and 229 which are held in position on the auxiliary flywheel 218 by a plurality of circumferentially distributed bolts 227 extending through registering bores provided in the plates 228, 229 and in the flywheel 218. The two annular plates 228 and 229 are surrounded by a pair of adjacent co-axially disposed annular members 222 and 223 provided with interior flanges 231 and 232 which extend into the space between the two annular plates 228 and 229, washers 225 and 226 of friction material being interposed between said plates and said flanges. The opposed faces of the annular members 222 and 223 are provided with annular grooves 219 in which a plurality of resilient elements, such as springs 221, are encased tending to urge the two annular members 222 and 223 apart into frictional engagement with the plates 228 and 229. Upon rotary oscillation imparted to the auxiliary flywheel 218, a relative reciprocatory rotation will occur between the plates 228, 229 and the annular members 222 and 223, and the energy of such rotation will be consumed by the coincidental friction of the washers 225 and 226.

In this embodiment, the driving element mounted on the end pin 211 adjacent to the auxiliary flywheel 218 is formed by a cup-shaped sheet metal member 220 having a conical face 233 in opposed relationship to a conical face 234 provided on the auxiliary flywheel, the two conical faces functioning as a pulley for the purpose of driving a radiator fan or the like by a suitable V-belt.

In Fig. 3 I have shown a six-throw crankshaft having seven line bearing pins including two end pins. The crank arms are provided with the customary flyweights 335 serving the purpose of counterbalancing the forces set up by the inertia of the pistons and other reciprocatory elements of the engine acting on the crank pins 310. The rear end pin 313 is rearwardly extended beyond its bearing and provided with a flange 336 bolted or otherwise fixed to the customary flywheel 317 which is shaped for cooperation with a friction clutch member 316 adapted to transfer the main driving force from the crankshaft to the driven shaft 315.

The front end pin 311 extends forwardly from its line bearing (not shown) and is provided with an auxiliary flywheel 318 and an oscillation absorber designated by 319 as a whole adapted to cooperate with the auxiliary flywheel. More particularly, the forwardly projecting end of shaft 311 is splined for the non-rotatable mounting thereon of a hub 337 provided with a flange 338 and with a shoulder 339. Mounted on the hub in engagement with such shoulder is a substantially annular disk constituting the flywheel 318. A key (not shown) is provided to prevent relative rotation of flywheel 318 and hub 337.

The auxiliary flywheel 318 is preferably dimensioned for a smaller inertia than flywheel 317.

The oscillation absorber 319 is similar to that shown in Fig. 2 comprising two annular members 322 and 323 provided with internal flanges 331 and 332 which extend into the space between flange 338 and flywheel 318 and are held in frictional engagement therewith by resilient elements, such as helical springs 340 or rubber blocks 341 inserted between the two annular elements 322 and 323. A ring 342 may be inserted between the hub 337 and the two flanges 331 and 332, and washers 325 and 326 of friction material may be inserted between the flanges 331, 332 and the flywheel 318 and the flange 338 of the hub.

Moreover, a driving element, such as a gear 320, may be mounted on the end pin 311 between the hub 337 and the line bearing (not shown).

Preferably, the side face of flywheel 318 adjacent to the oscillation absorber 319 is provided with an annular recess for the accommodation of the annular member 322 whereby a more compact structure is achieved.

While I have described a number of preferred embodiments of my invention, I wish it to be clearly understood that the same is in no way limited to the details thereof as shown and described, but is capable of numerous modifications within the scope of the appended claims. Thus, the auxiliary flywheel and/or the oscillation absorber may be mounted inside of the outermost line bearing or at any other desired point adjacent to the front end pin of the crankshaft. Also, my invention is in no way limited to six-throw crankshafts, but is applicable to any other multi-throw crankshaft, even though it is of particular usefulness for six-throw crankshafts.

What I claim is:

1. For use in an internal combustion engine, the combination comprising a multi-throw crankshaft having at least six crank pins, a pair of flywheels mounted on and attached to the crankshaft, said flywheels being disposed adjacent to opposite ends of said crankshaft and rigidly secured thereto, and an oscillation absorber cooperatively connected with said crankshaft and movable along the periphery of one of said flywheels.

2. The combination claimed in claim 1, in which the last mentioned one of said flywheels is dimensioned to have a smaller inertia than the other one of said flywheels, and wherein the oscillation absorber is arranged along the periphery of the fly wheel of the smaller inertia.

3. For use in an internal combustion engine, the combination comprising a six-throw crankshaft having seven line bearing pins including two end pins, a flywheel fixed to one of said end pins and shaped for cooperation with a friction clutch for the transfer from the crankshaft of the main driving force, an auxiliary flywheel fixed to the other one of said end pins, and an oscillation absorber mounted for movement on the periphery of said auxiliary flywheel in frictional engagement therewith.

4. For use in an internal combustion engine, the combination comprising a six-throw crankshaft having two end pins, a pair of flywheels rigidly secured to said crankshaft, said pair of flywheels being dimensioned to have different amounts of inertia, each mounted on a different one of said end pins, an oscillation absorber coordinated with and movable along the periphery of the flywheel having the smaller dimensions, the flywheel having the larger dimensions being shaped for cooperation with the friction clutch, and a driving element mounted on one of said end pins adjacent to said flywheel having the smaller dimensions.

5. For use in an internal combustion engine, the combination comprising a multi-throw crankshaft having at least six crank pins, a pair of fly wheels having different inertia mounted on and attached to said crankshaft, said fly wheels being disposed adjacent to opposite ends of said crankshaft, and an oscillation absorber operatively connected with said crankshaft and disposed along the periphery of the fly wheel of smaller inertia, said oscillation absorber including at least one annular member co-axially and rotatably mounted on the last-mentioned fly wheel and springs acting on said annular member to frictionally engage the same with the last-mentioned fly wheel.

6. The combination according to claim 5, further comprising an annular plate on each side of the last-mentioned fly wheel and connected therewith, said plates extending beyond the periphery of said last-mentioned fly wheel, a pair of annular members located between said plates, spring means normally urging said annular members apart, and washers made of friction material between said annular members and said annular plates.

7. For use in an internal combustion engine, the combination comprising a multi-throw crankshaft having at least six crank pins, a pair of flywheels mounted on and attached to said multi-throw crankshaft, said flywheels being disposed adjacent to opposite ends of said multi-throw crankshaft, and an oscillation absorber cooperatively connected with said multi-throw crankshaft and disposed along the periphery of one of said flywheels, said oscillation absorber being mounted on the last-mentioned one of said flywheels and comprising at least one annular member co-axially and rotatably mounted on said last-mentioned one of said flywheels, and springs acting on said annular member and adapted to frictionally engage said annular member with said flywheel.

8. For use in an internal combustion engine, the combination comprising a six-throw crankshaft having seven line bearing pins including two end pins, a flywheel fixed to one of said end pins and shaped for cooperation with a friction clutch for the transfer of the main driving source from said six-throw crankshaft, an auxiliary flywheel fixed to the other one of said end pins, and an oscillation absorber mounted on said auxiliary flywheel, said auxiliary flywheel and said oscillation absorber mounted thereon comprising a hub having an integral flange and being fixed to one of said end pins of said six-throw crankshaft, a flywheel keyed to said hub in spaced relationship to said flange, a pair of adjacent annular disks rotatably mounted on said hub between said flange and said flywheel, and resilient elements mounted between said annular disks and adapted to urge said annular disks apart into frictional engagement with said flange and said flywheel.

9. For use in an internal combustion engine, the combination comprising a multi-throw crankshaft having at least six crank pins, a pair of flywheels mounted on and rigidly attached to said crankshaft, said flywheels being disposed adjacent to opposite ends of said crankshaft, an oscillation absorber cooperatively connected with said crankshaft and mounted on one of said flywheels and comprising at least one annular member coaxially and rotatably mounted on the last-mentioned one of said flywheels for frictional engagement with a peripheral portion thereof, springs acting on said annular member and adapted to frictionally engage said annular member with said flywheel, and a driving element mounted on one of said end pins adjacent to said flywheel on which said oscillation absorber is mounted.

10. For use in an internal combustion engine, the combination comprising a multi-throw crankshaft having at least six crank pins, a pair of flywheels mounted on and rigidly attached to said crankshaft, said flywheels being disposed adjacent to opposite ends of said crankshaft, an oscillation absorber cooperatively connected with said crankshaft and disposed along the periphery of one of said flywheels, said oscillation absorber comprising at least one annular member coaxially and rotatably mounted on the last-mentioned one of said flywheels, springs acting on said annular member and adapted to frictionally engage said annular member with said flywheel at its periphery, and flyweights arranged on the crank arms of said crankshaft.

References Cited in the file of this patent

UNITED STATES PATENTS

| | | |
|---|---|---|
| 1,234,978 | Vincent | July 31, 1917 |
| 1,257,052 | Tibbetts | Feb. 19, 1918 |
| 1,377,849 | Ofeldt | May 10, 1921 |
| 1,718,100 | Ackerman | June 18, 1929 |
| 1,718,207 | Anibal | June 25, 1929 |
| 1,765,477 | Ackerman | June 24, 1930 |
| 1,896,962 | Lee | Feb. 7, 1933 |
| 1,896,969 | Paton | Feb. 7, 1933 |
| 1,903,919 | Griswold | Apr. 18, 1933 |
| 2,041,507 | Zeder | May 19, 1936 |
| 2,073,661 | Tibbetts | Mar. 16, 1937 |
| 2,152,710 | Schwaiger | Apr. 4, 1939 |
| 2,346,972 | Kishline | Apr. 18, 1944 |